United States Patent [19]
Neuffer

[11] 3,861,141
[45] Jan. 21, 1975

[54] FUEL PRESSURIZATION FOR MOMENTUM COMPRESSION RAMJET ENGINE

[75] Inventor: Bruce H. Neuffer, Huntsville, Ala.

[73] Assignee: Brown Engineering Company, Inc., Huntsville, Ala.

[22] Filed: Sept. 26, 1973

[21] Appl. No.: 400,749

Related U.S. Application Data

[62] Division of Ser. No. 172,417, Aug. 17, 1971, Pat. No. 3,768,257.

[52] U.S. Cl. ............. 60/267, 60/39.48, 60/259, 60/260
[51] Int. Cl. ............................... F02k 9/02
[58] Field of Search ......... 60/259, 39.48, 260, 267, 60/269

[56] References Cited
UNITED STATES PATENTS

| | | | |
|---|---|---|---|
| 2,395,113 | 2/1946 | Goddard | 60/259 |
| 2,502,332 | 3/1950 | McCollum | 60/267 |
| 2,701,441 | 2/1955 | Mitchell | 60/259 |
| 2,704,438 | 3/1955 | Sheets | 60/259 |
| 3,049,870 | 8/1962 | Chamberlain | 60/260 |
| 3,136,121 | 6/1964 | Barger et al. | 60/39.48 |
| 3,237,401 | 3/1966 | Peters et al. | 60/267 |
| 3,427,806 | 2/1969 | Truex et al. | 60/39.48 |
| 3,516,254 | 6/1970 | Hammond | 60/260 |
| 3,517,510 | 6/1970 | Melenric | 260/39.49 |

*Primary Examiner*—Carlton R. Croyle
*Assistant Examiner*—Warren Olsen

[57] ABSTRACT

A momentum compression ramjet engine employing energy from a high velocity stream of gaseous fuel injected into the open inlet of the engine to accelerate and compress the air by momentum exchange. Velocity energy is converted to pressure energy in a diffuser before the air-fuel mixture enters the combustion chamber where the fuel burns to raise the temperature before the gas is expanded through a jet nozzle. Maximum thrust-to-engine weight ratio and performance characteristics are obtained by the configuration of the air-fuel mixing and compressing chamber of the engine, and novel means utilizing heat of combustion may be employed to maintain pressure in the fuel system.

10 Claims, 17 Drawing Figures

FUEL PRESSURIZATION FOR MOMENTUM COMPRESSION RAMJET ENGINE

This is a division of application Ser. No. 172,417, filed Aug. 17, 1971, now U.S. Pat. No. 3,768,257.

BACKGROUND OF THE INVENTION

1. Field of the Invention

This invention relates to ramjet engines, and more particularly to an improved momentum compression ramjet engine in which momentum from a high velocity stream of gaseous fuel injected into the open inlet of the engine is transferred to inlet air to provide sufficient compression to produce substantial engine thrust at zero and near zero engine velocity.

2. Description of the Prior Art

Numerous attempts have been made to develop a jet engine which would operate without the conventional air compressor or other mechanical devices for supplying air under pressure to the combustion chamber of the engine. Best known of these prior art devices is the conventional ramjet engine which employs the ram effect of the engine moving through the air to provide the necessary compression, but which has the serious limitation of being inoperative until boosted to a critical speed of about Mach 0.3 or greater because of the absence of sufficient compression of the inlet air at lower speeds.

To overcome the conventional ramjet's inherent limitation due to its critical minimum operating speed, attempts have been made to induce a sufficient air flow at lower speeds by an aspiration effect produced by injecting the fuel at a high velocity into the air at the open inlet of the engine. Typical of these prior art devices are those illustrated in U.S. Pat. Nos. 2,502,332 and 2,542,953, each of which teach the concept of heating a liquid fuel, under pressure, to gasify the fuel before injecting it into the open inlet of the engine. These devices relied upon an exchange of momentum between the gaseous fuel and the inlet air to provide the energy for compressing the air at engine speeds below the minimum critical speed for ramjet operations, with the ram effect being additive at speeds above the critical speed.

While these prior art devices may have been operable in the sense that they were at least theoretically capable of sustaining combustion and therefore developing some jet thrust or usable energy at or near zero velocity, they have nevertheless been unsatisfactory for practical use. For example, they have not been considered practical as aircraft propulsion engines because they have generally not been capable of generating sufficient jet thrust at or near zero speeds to accelerate the aircraft to the required lift-off velocity. Further, the prior art devices have been excessively complex, heavy, and expensive to manufacture, and have been extremely inefficient and unreliable in performance. Limitations on the power range (maximum to minimum thrust ratio) and the propensity to flame out, or loose power, are also defects of known prior art devices.

SUMMARY OF THE INVENTION

The foregoing and other defects and limitations of the prior art are overcome by the ramjet engine according to the present invention wherein inlet air is mixed with a high velocity jet of gaseous fuel in a mixing tube and accelerated by momentum exchange which provides sufficient compression to produce substantial engine performance at and near zero flight velocity. The length of the mixing tube is such that a substantially complete mixing of the fuel and air is accomplished before the mixture flows into a diffuser including a conical section where the velocity energy of the mixture is converted into pressure energy — hence, to name "momentum compression" engine. The diffuser may also include a cylindrical dump section downstream from the conical portion and leading into the combustion chamber. The inclusion of a dump section of sufficient length has been found to act as an effective flame holder, thereby greatly increasing the operational stability of the engine, especially in small diameter engines which have been particularly susceptible to flame-out.

The engine is designed to use a low molecular weight, volatile hydrocarbon or other pressure liquifiable fuel, and a closed fuel system employing the vapor pressure of the fuel is employed to deliver the fuel under pressure to a fuel injection nozzle positioned in the engine inlet. Vapor pressure in the fuel system may be maintained at the necessary level by a heat exchange system for transferring heat from the combustion chamber to the pressurized fuel system. If desired, in order to increase the maximum-to-minimum thrust ratio available from the engine, oxidizers may be injected into the fuel-air mixuture, either at the inlet of the engine, or at some point spaced therefrom including the combustion chamber.

In order to reduce the overall length, and consequently the weight, of the engine, particularly for medium and large size engines, fuel may be injected into the open inlet from a plurality of radially and circumfrentially spaced nozzles. In addition, a plurality of parallel mixing tubes may be provided, each having one or more fuel injection nozzles positioned in its open inlet and controlled by independent throttle valves enabling one or more of the separate mixing tubes to be by-passed in operation to thereby reduce the minimum thrust available without risking a flame-out as a result of a too-lean fuel-air mixture. Various combinations of the above features may be employed, as desired, in order to provide an engine having the desired operational characteristics. Accordingly, it is the primary object of the present invention to provide an improved, economical, and reliable momentum compression ramjet engine particularly useful as a propulsion system for missiles and other flight vehicles where engine weight, initial cost, and operational simplicity are primary considerations.

Another object of the invention is to provide such a momentum compression ramjet engine employing an improved momentum exchange pressure system capable of supplying sufficient air and fuel to provide substantial thrust at and near zero velocities, and to provide a maximum range of power available during operation of the engine in flight.

Another object is to provide such a momentum compression ramjet engine having an improved pressurized fuel system.

BRIEF DESCRIPTION OF THE DRAWINGS

The foregoing and other objects and advantages of the invention will become apparent from the description contained herein when taken in conjunction with the drawings, in which.

DESCRIPTION OF THE PREFERRED EMBODIMENTS

Figure 1A:
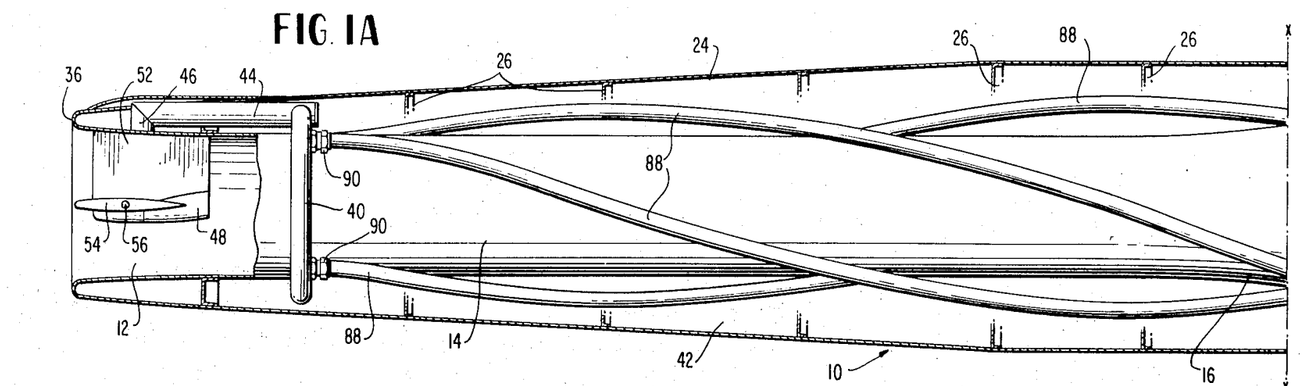
FIGS. 1A and 1B are, respectively, side elevation views, partially in section, of the forward and rear portions of an improved momentum compression ramjet engine according to the present invention.
Figure 1B:
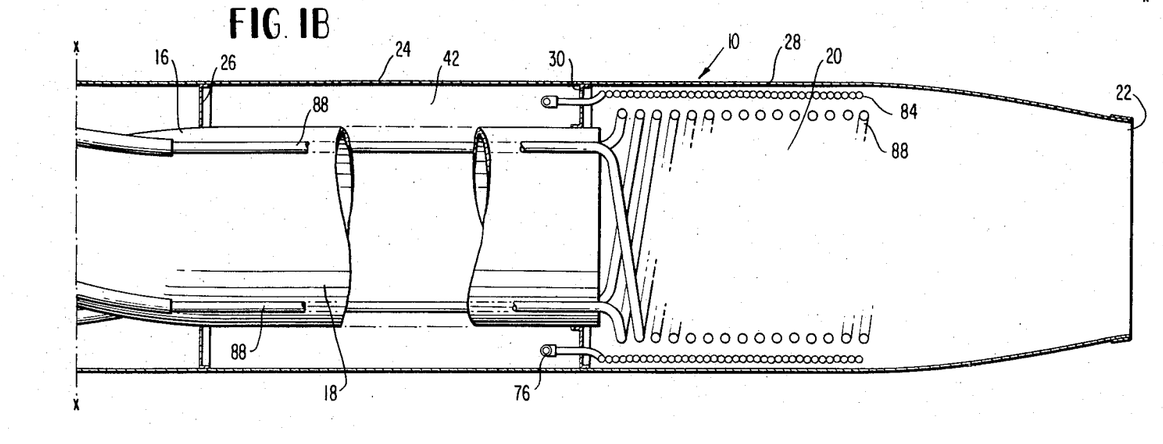
Figure 6:
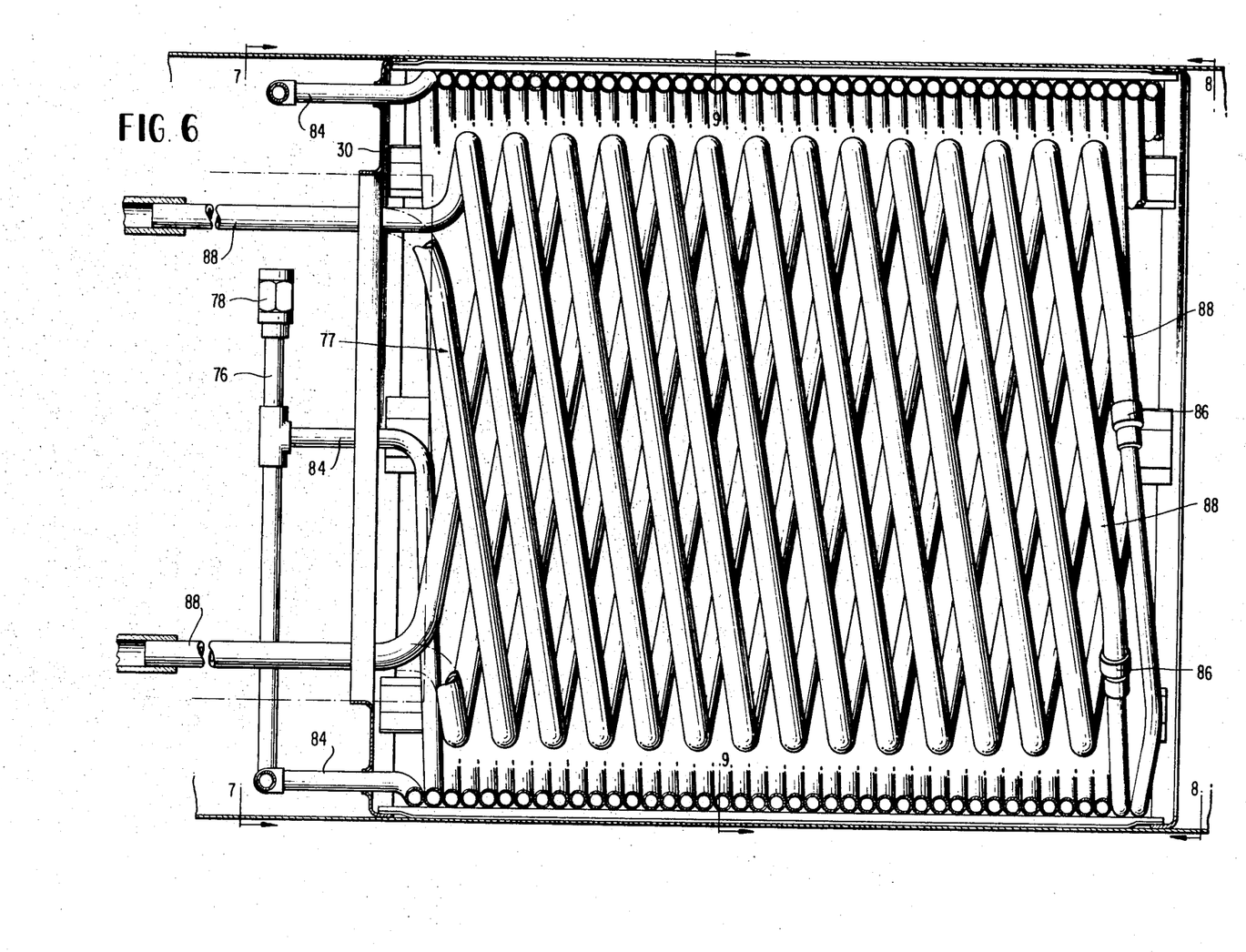
FIG. 6 is a further enlarged view of a portion of the combustion chamber and fuel supply system for the improved engine according to the present invention.
Figures 7, 8, 9:
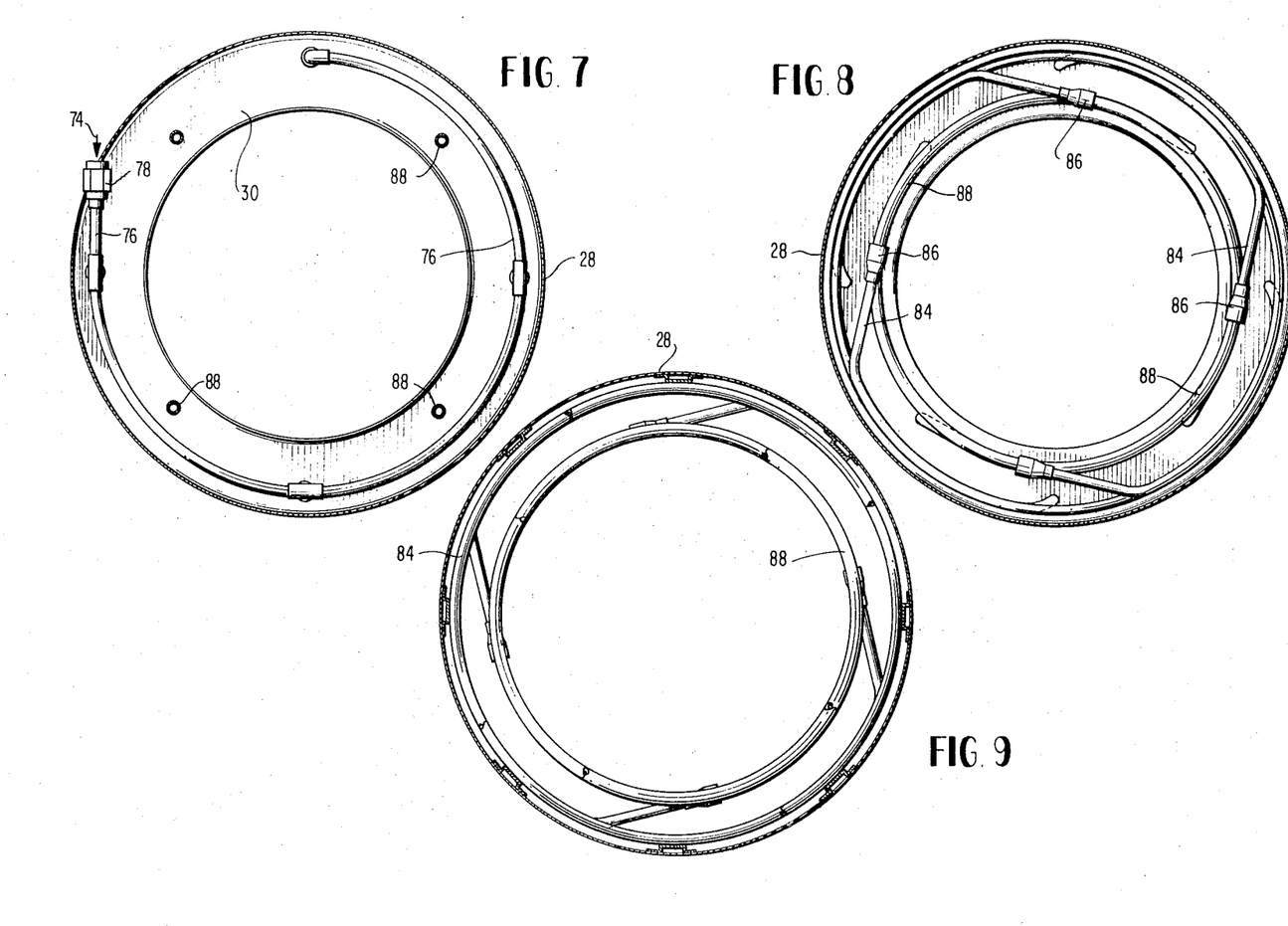
FIG. 7 is a sectional view taken along lines 7—7 of FIG. 6.
FIG. 8 is a sectional view taken along line 8—8 of FIG. 6.
FIG. 9 is a sectional view taken along line 9—9 of FIG. 6.

Referring now to the drawings in detail, an improved momentum compression ramjet engine according to the present invention is indicated generally by the reference numeral 10 and includes an open inlet 12 connected to the forward end of a cylindrical mixing tube 14 having its outlet connected to the forward inlet portion of the engine diffuser. The diffuser includes a forward, conical portion 16 and a rearwardly extending generally cylindrical dump portion 18 which discharges into the forward end of the combustion chamber 20 which, in turn, terminates in an open, fixed jet nozzle 22. The inlet, mixing tube, and diffuser portions of the engine are supported concentrically within an elongated, generally cylindrical cowling or housing 24 by a plurality of annular bulkheads or frames 26 positioned at spaced intervals along the length thereof. As best seen in FIGS. 1B and 6, the outer cylindrical wall 28 of combustion chamber 20 is an axial extension of the cowling 24, and the annular bulkhead 30 supporting the after end of dump tube 18 forms the forward end wall of the combustion chamber.

The open inlet 12 is defined by a smooth inner wall 32 having a minimum diameter at its aft end 34 which is equal to the diameter of the forward end of the mixing tube 14. The wall 32 flares outwardly slightly toward the forward end of the inlet, and terminates in a rounded, in-turned nose section 36 of the outer cowling 24.

Figure 2:
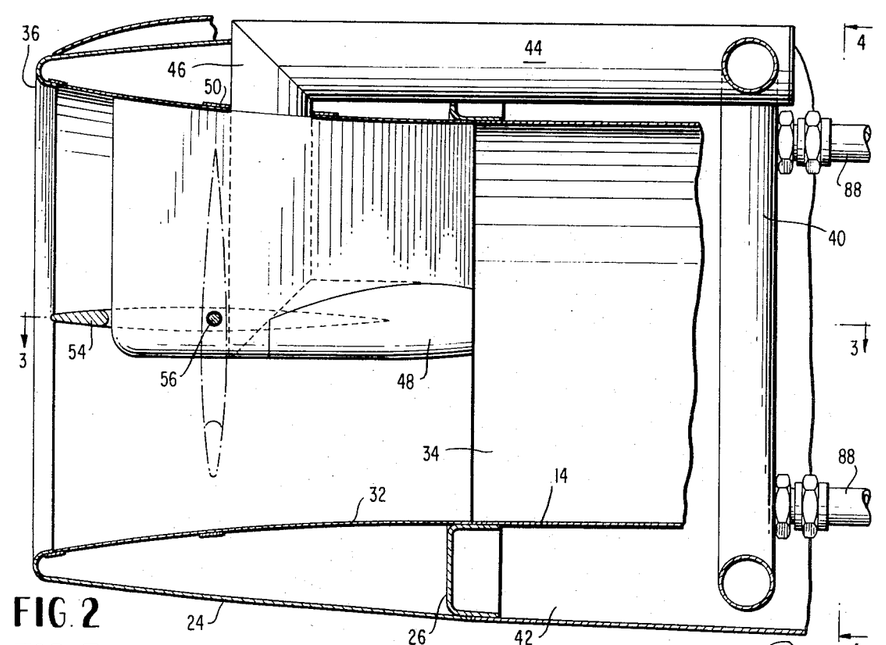
FIG. 2 is an enlarged sectional view of a portion of the structure shown in FIG. 1A.
Figure 3:
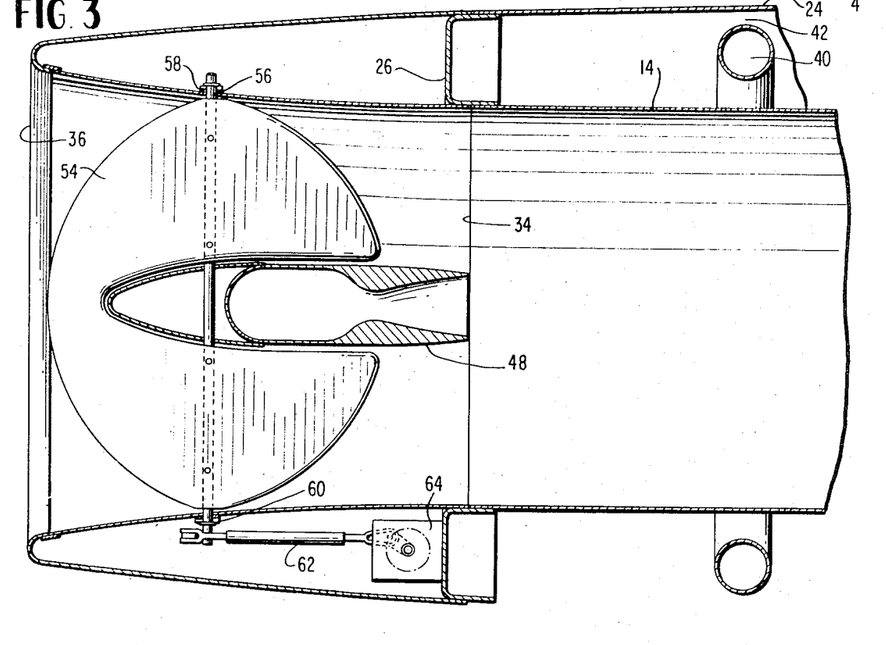
FIG. 3 is a sectional view taken along line 3—3 of FIG. 2.
Figure 4:
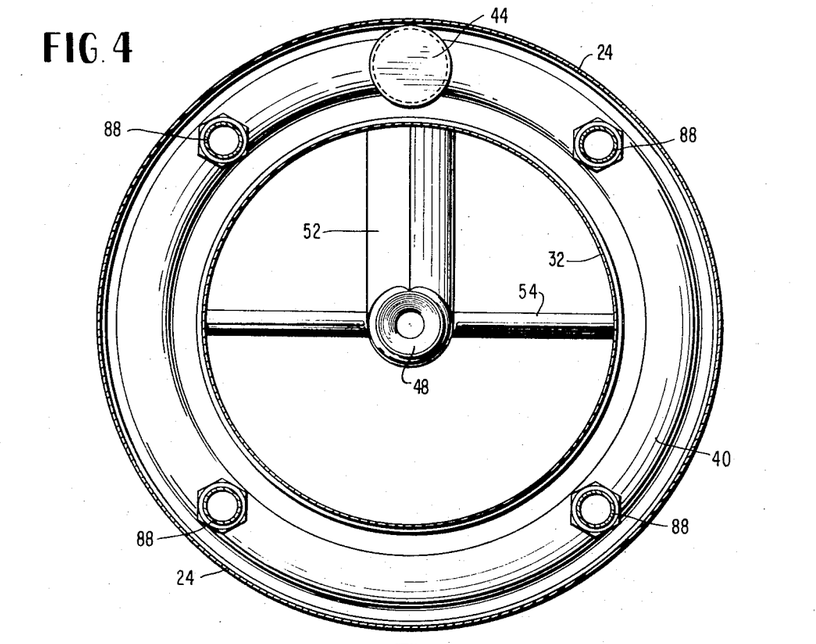
FIG. 4 is a sectional view taken along line 4—4 of FIG. 2.
Figure 5:
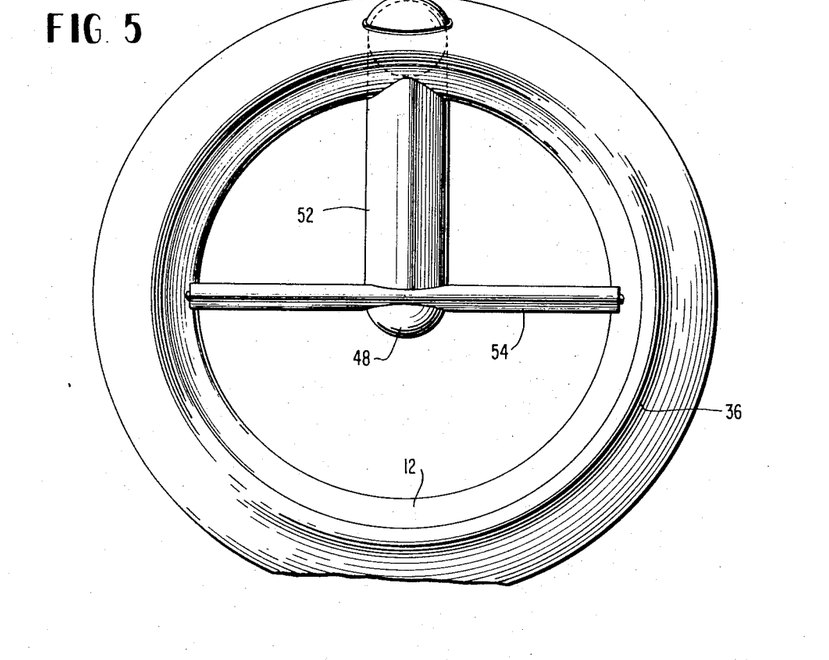
FIG. 5 is an enlarged front elevational view of the engine shown in FIG. 1A.

An annular fuel manifold 40 is mounted within the space 42 between the cylindrical wall of the mixing tube 14 and the outer cowling 24, at a position adjacent the forward end of the mixing tube. Manifold 40 is connected to the forwardly extending leg 44 of an L-shaped fuel conduit which has its second leg 46 extending radially through the wall 32 of inlet 12 to terminate centrally within the inlet 12. A rearwardly directed fuel injection nozzle 48 is rigidly mounted on the distal end of the conduit leg 46, with nozzle 48 being located concentrically in the open inlet 12 and terminating at its rear end at a position adjacent the forward end of the mixing tube 14. Conduit leg 46 is rigidly supported in position by a flange 50 welded to the outer surface of inlet housing 32 and by an airfoil-shaped cowling 52 rigidly welded to the inner surface of the wall 32 to minimize the turbulence of air flowing around conduit leg 46. A butterfly valve 54 is positioned in the open inlet 12 and supported by a transverse shaft 56 journaled, as by bearings 58, 60, for rotation about an axis transverse to the inlet to regulate the flow of air into the engine. The position of the butterfly valve 54 is controlled by a linkage indicated, generally at 62, actuated by a suitable motor and gear arrangement indicated at 64. This butterfly valve and valve actuating mechanism may be eliminated on small diameter versions of the engine, as well as upon certain embodiments of the invention employing multiple fuel injection nozzles and/or multiple mixing tubes, described more fully hereinbelow.

Figure 14:
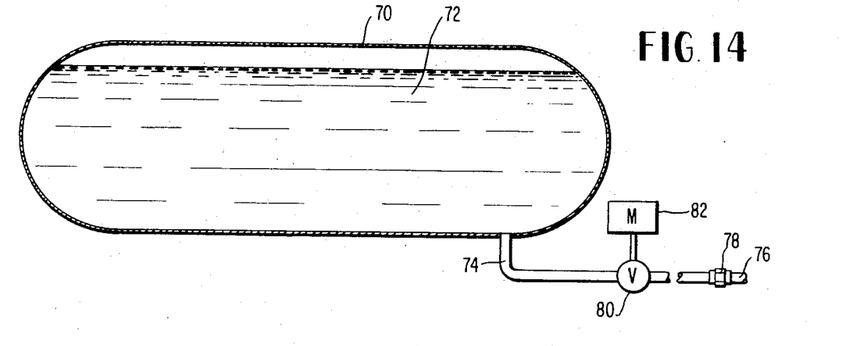
FIG. 14 is a schematic view of the pressurized fuel system employed in the engine shown in FIGS. 1-9.

To supply gaseous fuel, under pressure, to the manifold 40, and the nozzle 48, a fuel tank is provided in the form of a high strength pressure vessel 70 for containing a supply of highly volatile liquid fuel 72, such as pressure liquifiable ethane. A conduit 74 leads from the tank 70 and is connected to the manifold 76 of a heat exchanger 77 by a tube coupling 78, and a throttle valve 80 connected in conduit 74 controls the flow of liquid fuel from the tank. A suitable radio-controlled motor, indicated generally at 82, controls the positioning of the throttle valve 80.

As most clearly seen in FIGS. 6-9, the heat exchanger 77 is made up of a plurality of tubes 84 each having one end connected to the manifold 76, and coiled around the internal surface of the combustion chamber 20. The conduits 84 have their other ends connected, as by couplings 86 to larger conduits 88 each coiled within combustion chamber 20 radially inward from the coil of the conduits 84. The respective conduits 88 extend forward from the combustion chamber within the space 42 within the cowling 24 and are connected, as by couplings 89, to the manifold 40. Thus it is seen that pressure within the pressurized fuel tank 70 will cause the liquified volatile fuel 72 to flow through conduit 74, upon opening of the throttle valve 80, to the heat exchanger 77. Heat absorbed by the fuel in the heat exchanger will vaporize the fuel before it passes through the manifold 40 to be expanded and discharged at a high velocity through the injection nozzle 48.

Use of a highly volatile fuel such as ethane, which has a vapor pressure of approximately 40 atmospheres at $-1.5°C$., will assure sufficient pressure at the fuel injection nozzle 43 to aspirate sufficient air into the engine to sustain combustion even under cold start-up, zero velocity conditions. The heat exchanger 77, located within the combustion chamber will commence absorbing heat to vaporize the fuel immediately upon start-up to assure the maintenance of a high velocity stream of gaseous fuel ensuing from the injection nozzle and quickly increase the thrust available from the engine.

Figures 11, 12, 13:
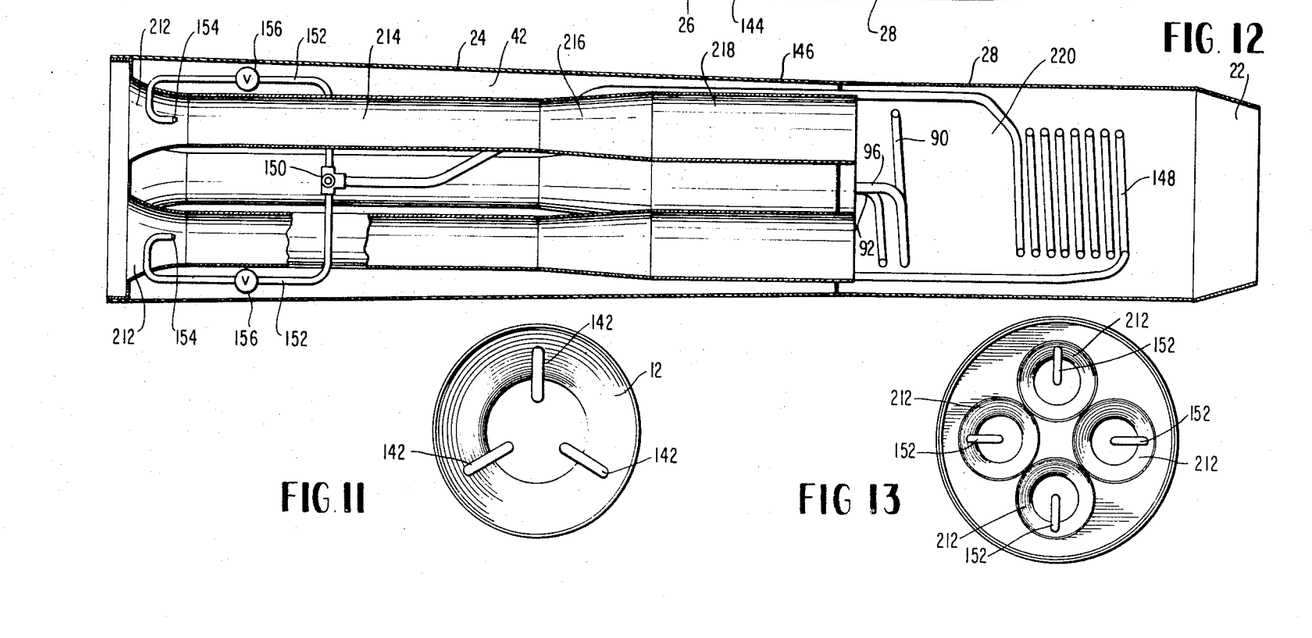
FIG. 11 is a front elevational view of the engine illustrated in FIG. 10.
FIG. 12 is an elevational view, partially in section, of a further modification of the invention.
FIG. 13 is a front elevation view of the engine illustrated in FIG. 12.
Figure 15:
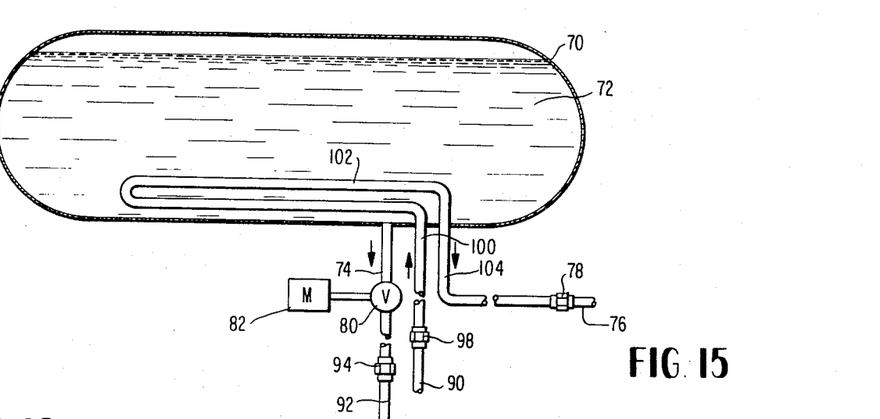
FIG. 15 is a schematic view of a modified pressurized fuel system.

Referring to FIGS. 12 and 15 of the drawings, a modification of the pressurized fuel system will be described. In this embodiment, a second heat exchanger 90 mounted within the combustion chamber 20 has its inlet 92 connected, through coupling 94, to the conduit 74 leading from the fuel tank 70 and its outlet 96 connected through coupling 98 to the inlet 100 of a third heat exchanger 102 mounted within the tank 70 below the level of the liquid fuel therein. Heat exchanger 102 has its outlet 104 connected through the coupling 78 to the inlet manifold 76 of heat exchanger 77. Thus, in this embodiment, liquid fuel flowing from the tank 70 passes first through the relatively small heat exchanger 102 to pick up a quantity of heat from the combustion chamber, then returns to the heat exchanger 102 positioned within the body of the fuel 72 where at least a portion of the heat is surrendered before flowing back through the primary heat exchanger 77 and to the nozzle. Thus, as liquid fuel is drawn from the tank 70, thereby tending to reduce the vapor pressure and cool the liquid fuel within the pressure vessel, heat added to the volume of liquid fuel 72 will maintain the temperature of the liquid, and consequently the vapor pressure, at the desired level so that there is no tendancy for the fuel pressure to drop as fuel is rapidly withdrawn from the tank.

Figure 10:
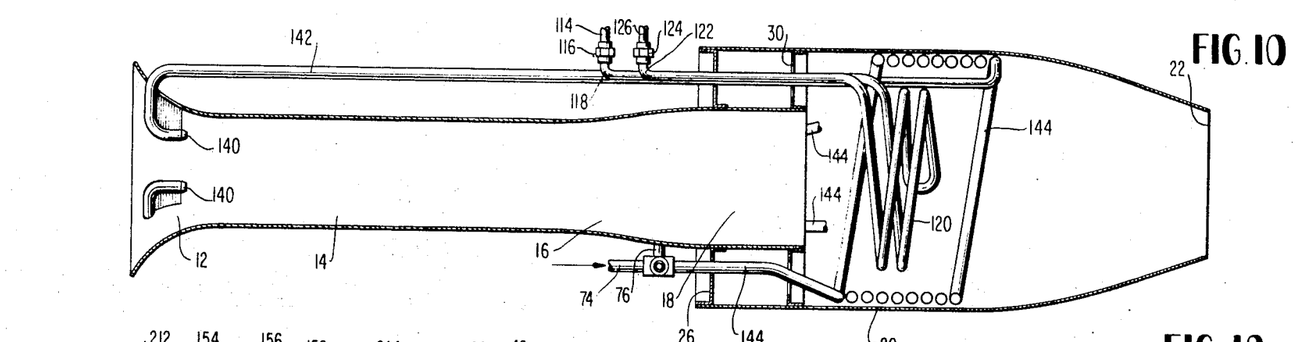
FIG. 10 is an elevational view, partially in section, of a modified version of the engine.
Figure 16:
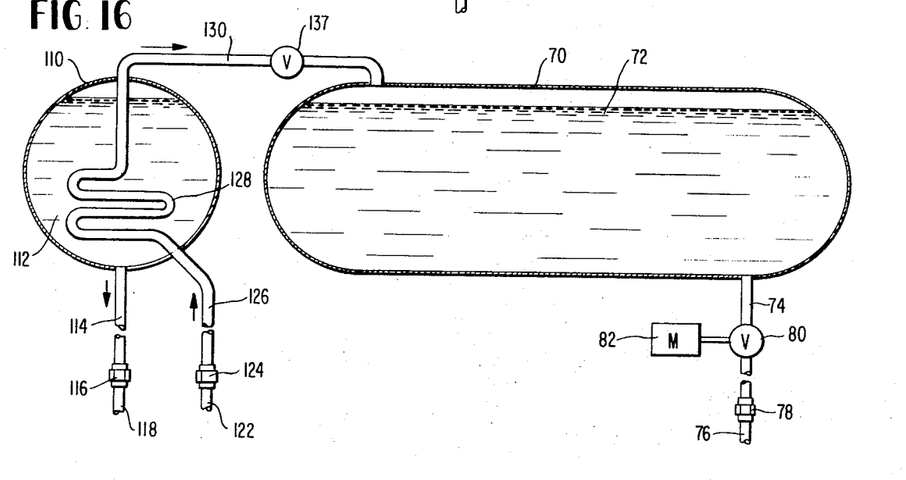
FIG. 16 is a schematic view of a further modified fuel system.

Referring to FIGS. 10 and 16, a further embodiment of the fuel pressurization system is illustrated. In this embodiment, the basic fuel tank and supply system is essentially the same as that described with regard to FIGS. 6–9 and 14, but further includes means for maintaining the vapor pressure within the tank 70 at a level above the required minimum for efficient operation of the engine. This embodiment is particularly useful when employing a primary fuel such as propane which normally has a relatively low vapor pressure as compared to other more exotic and expensive fuels such as ethane. In this embodiment, a second relatively small pressure vessel 110 contains a volume 112 of a highly volatile fuel such as ethane. A conduit 114 leads from the tank and is connected, through coupling 116, to the inlet 118 of a heat exchanger 120 mounted within the combustion chamber 20. The outlet 122 of the heat exchanger 120 is connected, through coupling 124 to the inlet 126 of a heat exchanger 128 mounted within the small pressure vessel 110. The outlet of the heat exchanger 128 is connected, through conduit 130 and valve 137, to the top portion of the fuel tank 70. Preferably, valve 137 is a pressure activated valve, controlled by the pressure within fuel tank 70, so that the valve automatically opens upon the vapor pressure dropping below a predetermined minimum.

In operation of the engine employing this fuel system, the valve 137 is opened upon ignition of the engine so that the vapor pressure of the highly volatile fuel 112 is applied to the less volatile fuel 72 in the fuel tank 70. As fuel is withdrawn from tank 70, thereby increasing the volume and reducing the pressure of the vapor in the tank, liquid fuel will flow from tank 110 into the heat exchanger 120 where it will be heated and vaporized, then back through the heat exchanger 128 to surrender a portion of its heat before passing, still as a vapor, into the void above the level of the liquid 72 in fuel tank 70. Thus, the pressure within the tank 70 will be maintained at the vapor pressure of the more volatile fuel within the small tank 110.

Referring to FIGS. 10 and 11, a modification of the basic geometry of an engine according to the invention is illustrated in which three fuel injection nozzles 140 are mounted in the open inlet 12 of the engine. The nozzles 140 are radially and circumferentailly equally spaced, and each nozzle is connected, through a conduit 142 to a coil 144 of the primary fuel heat exchanger positioned within the combustion chamber 20. In order to simplify the illustration, only one coil 144 is illustrated in FIG. 10, it being understood that three such coils, each having its inlet connected to the fuel inlet manifold 76 and its outlet connected to a separate conduit 142, would normally be employed for this construction. Alternatively, of course, a single, large coil 144 could be employed, with the outlet 142 being connected to a manifold which, in turn, would be connected to the three fuel nozzles.

Referring now to FIGS. 12 and 13, a further modification of the invention is illustrated wherein the outlet conduit 146 of the primary fuel heat exchanger 148 is connected to a manifold 150 which, in turn, is connected to four individual conduits 152 each connected to and supplying fuel to a separate fuel injection nozzle 154. In this arrangement, the respective fuel injection nozzles 154 are each positioned centrally within the open inlet 212 leading to the inlet end of a mixing tube 214. The individual mixing tubes 214 have their outlet connected to the inlet portion of a diffuser section including a conical portion 216 and a cylindrical dump tube portion 218, with the respective dump tubes 218 having their outlet communicating directly with the forward inlet end of the conbustion chamber 220. The four mixing tubes and diffusers are arranged concentrically around the longitudinal axis of the engine and co-operate to provide four separate mixing and difusing paths leading from the inlet of the engine to the combustion chamber. As indicated in FIG. 12, each of the respective fuel supply conduits 152 are provided with shutoff valves 156 which may be employed to stop the flow of fuel to any one or more of the respective fuel injection nozzles 154.

The embodiments of the invention illustrated in FIGS. 10–13, and described above, are particularly useful in adapting the engine to provide a relatively wide throttling range for a momentum compression ramjet engine employing a fixed geometry jet nozzle. As is well known, a fixed geometry jet nozzle is relatively simple to design and highly economical, from the standpoint of initial cost, when compared with variable area jet nozzles. However, thrust and specific impulse limitations of such fixed geometry nozzles greatly restrict the vehicle flight characteristics. For example, an engine size to be throttled to meet cruise drag requirements will tend to have poor acceleration and climb characteristics, particularly at speeds below about Mach 0.7 where the available ratio of minimum to maximum thrust may be in the range of about 0.6 to 1, these restrictions being imposed by mixture ratio flammability limits for lightweight hydrocarbon fuels. Further, at higher altitudes, the problem becomes more critical because acceleration and climb cannot be performed below increasingly higher Mach numbers required to provide the necessary ram air.

The embodiments of the engine illustrated in FIGS. 10 and 13, and other combinations of the features illustrated therein, provide a relatively simple solution to the above problem without resorting to the use of the variable geometry nozzle. For example, the multiple nozzle embodiment of the engine, illustrated in FIGS. 10 and 11, greatly reduces the length of the mixing tube required to produce the required air-fuel mixing, and therefore substantially reduces the overall length and weight of the engine. For example, experiments have shown that, for good engine performance for a single mixing tube momentum compression ramjet engine, the minimum mixing tube length is about 7 times its diameter with shorter tubes substantially reducing engine performance because of incomplete air-fuel mixing before diffusion, and greater lengths resulting in excess friction losses. However, by providing a multi-nozzle array at the inlet of the mixing tube, it has been found that the length of mixing tube required to provide substantially complete air-fuel mixing is reduced to seven times the effective diameter served by each nozzle of the array. When three or more nozzles are employed, this effective diameter ($D_e$) has been found to be equal to the actual diameter ($D_i$) of the mixing tube divided by the square root of the number of nozzles $\sqrt{N}$. Thus, for example, for a mixing tube having a $D_i$ of 2 inches, and employing an array of four nozzles (N=4), the effective diameter is: $D_e = 2/\sqrt{4} = 1$, and the required length of tube (L) is: $L = 1 \times 7 = 7$ inches. Since a tube length of 14 inches would have been required ($7 \times D_i$) for a single nozzle, it is seen that a substantial savings in engine length and weight can be realized by the use of multiple nozzles.

For relatively small engines, the required length of conical diffuser necessary to convert the velocity energy to pressure energy is correspondingly short. However, operation of such small diameter engines in which the air-fuel mixture passes directly from the conical diffuser into the combustion chamber has been particularly troublesome due to the inability to maintain the flame in the combustion chamber. This difficulty has been overcome in the engine according to the present invention by providing a dump tube on the end of the conical diffuser which acts as a flame holder. While the dump tube is a simple cylindrical tube having a diameter equal to the diameter of the exit of the conical diffuser section, it nevertheless acts as an effective flame holding device. For small diameter engines, the length of this dump tube required to act as an effective flame holder has been found to be approximately three times its diameter, whereas for larger engines, the length may be somewhat less.

Further operational advantages are accomplished by the embodiment illustrated in FIGS. 12 and 13 which employ a plurality of fuel-air mixing tubes, each served by its own primary fuel flow nozzles, or nozzles. This results in a substantially reduced engine weight and overall engine length due to the substantial reduction in the length of the mixing and difusing section resulting from the reduction in the diameter ($D_i$) of the individual mixing tubes. By providing valves which may be employed to selectively cut off the fuel flow through the primary fuel nozzles to the individual mixing tubes, the engine may be operated on a bypass mode. Thus, air flowing through those tubes whose primary fuel nozzle flow is cut off would bypass the mixing process and to a substantial extent also bypass the combustion process due to the fact that this air would not become fully mixed with the combustion gases until near the jet nozzle. This construction results in a maximum specific impulse which is approximately twice that of the single mixing tube embodiment, with the result that, in an engine having four parallel, concentrically arranged mixing tubes operating at speeds of about Mach 0.7 with fuel cut off to two of four mixing tubes, the cruising time for a given flight vehicle being substantially doubled. Further, operation at the very high air-to-fuel ratios available on this bypass mode requires a larger jet nozzle diameter than for the conventional single mixing tube engine, with the result that the maximum thrust capacity of the engine is also increased. Thus, the throttling range of a four mixing tube engine over that of a single mixing tube engine having the same size combustion chambers was increased from a ratio of 1.6:1 to 2.5:1. Stated another way, the bypass engine could be throttled to 40 percent of full thrust whereas the comparable single tube engine could be throttled only to 62 percent of a maximum thrust.

It should be apparent that, by combining the multiple nozzle concept with the multiple tube concept, an engine having minimum length and weight and maximum operating range may be produced. Thus, while I have disclosed and described preferred embodiments of my invention, I wish it understood that I do not intend to be restricted solely thereto, but that I do intend to include all embodiments thereof which would be apparent to one skilled in the art and which come within the spirit and scope of my invention.

I claim:

1. In a momentum compression ramjet engine having a combustion chamber including an outlet in the form of a jet nozzle and means supplying a combustible mixture of fuel and air under pressure to said combustion chamber including at least one injection nozzle positioned to direct a stream of high velocity gaseous fuel into the open inlet of an elongated mixing tube to mix with ambient air within the mixing tube and accelerate the air through the tube from the open inlet by momentum exchange, the improvement wherein said means supplying said combustible mixture of fuel and air comprises a first mixing tube of substantially uniform diameter and having a length within the range of six to eight times the effective diameter of the mixing tube wherein the effective diameter of said mixing tube is equal to the actual diameter thereof divided by the square root of the number of fuel injection nozzles positioned in the open inlet of the mixing tube, a conical diffuser section for converting velocity energy into pressure energy and having an inlet connected directly to the outlet of said mixing tube, a pressure vessel containing a volume of volatile liquid, a first heat exchanger mounted on said engine in position to absorb heat from said combustion chamber, a second heat exchanger in heat exchange relation with said volatile liquid, conduit means operatively connecting said first and second heat exchangers to one another, and means for circulating volatile liquid from said pressurized vessel through said conduit means to said first heat exchanger to absorb heat from said combustion chamber and to said second heat exchanger to surrender heat to said volume of volatile liquid within said pressure vessel to thereby maintain a predetermined minimum vapor pressure within said pressure vessel for maintaining pressure in said pressurized fuel system as fuel is used therefrom to operate the engine.

2. In a momentum compression ramjet engine including momentum compression means for supplying a combustible mixture of gaseous fuel and air under pressure, the improvement wherein said momentum compression means comprises a mixing and accelerating chamber, a plurality of elongated mixing tubes mounted in generally parallel spaced relation within said chamber, said mixing tubes each having an open inlet for admitting ambient air, at least one fuel injection nozzle mounted in the open inlet of each said mixing tube and positioned to discharge a high velocity stream of gaseous fuel axially therethrough from said open end, said mixing tubes each having an outlet communicating with a common combustion chamber having an outlet in the form of a jet nozzle, a pressurized fuel system including a first heat exchanger mounted in said engine in position to absorb heat from said combustion chamber, a pressure vessel containing a volume of volatile liquid, a second heat exchanger in indirect heat exchange relation with said volatile liquid, conduit means operatively connecting said pressure vessel and said first heat exchanger and connecting said first and second heat exchangers to one another, and means for circulating volatile liquid from said pressurized vessel through said conduit means from said pressure vessel to said first heat exchanger to absorb heat from said combustion chamber and then to said heat exchanger to surrender heat to said volume of volatile liquid within said pressure vessel to thereby maintain a predetermined minimum vapor pressure within said pressure vessel for maintaining pressure in said pressurized fuel system as fuel is used therefrom to operate the engine.

3. In the momentum compression ramjet engine as defined in claim 2, the further improvement wherein said fuel system comprises a closed fuel tank for containing a supply of liquid fuel under pressure, and conduit means connecting said fuel tank and said pressure vessels whereby vapor pressure in said pressure vessel maintains the pressure in said fuel tank as fuel is withdrawn therefrom to operate said engine.

4. In the momentum compression ramjet engine as defined in claim 2 the further improvement wherein said pressure vessel is the engine fuel tank and said volatile liquid is a pressure liquifiable fuel, said fuel system further comprising conduit means operatively connecting said second heat exchanger to said fuel injection nozzle for conveying fuel from said second heat exchanger to said fuel injection nozzle.

5. In a momentum compression ramjet engine including a combustion chamber having an outlet in the form of a jet nozzle, and means supplying a combustible mixture of gaseous fuel and air under pressure to said combustible chamber, a pressurized fuel system comprising, a first heat exchanger mounted on said engine in position to absorb heat from said combustion chamber, a pressure vessel containing a volume of volatile liquid, a second heat exchanger in indirect heat exchange relation with said volatile liquid, conduit means operatively connecting said pressure vessel, said first, and second heat exchangers to one another, and means for circulating volatile liquid from said pressurized vessel through said conduit means to said first heat exchanger to absorb heat from said combustion chamber and then from said first to said second heat exchanger to surrender heat to said volume of volatile liquid within said pressure vessel to thereby maintain a predetermined minimum vapor pressure within said pressure vessel for maintaining pressure in said pressurized fuel system as fuel is used therefrom to operate the engine.

6. In the momentum compression ramjet engine as defined in claim 5, the further improvement wherein said fuel system comprising a closed fuel tank for containing a supply of liquid fuel under pressure, and conduit means connecting said fuel tank and said pressure vessels whereby vapor pressure in said pressure vessel maintains the pressure in said fuel tank as fuel is withdrawn therefrom to operate said engine.

7. In the momentum compression ramjet engine as defined in claim 6 the further improvement wherein said fuel system comprises a third heat exchanger in heat exchange relation with said combustion chamber, a fuel injection nozzle for discharging a high velocity stream of gaseous fuel into the inlet of said engine, and conduit means operatively connecting said fuel tank to said third heat exchanger and connecting said third heat exchanger to said fuel injection nozzle whereby vapor pressure in said fuel tank will force liquid fuel through said third heat exchanger to absorb heat from said combustion chamber before being discharged from said fuel injection nozzle.

8. In the momentum compression ramjet engine as defined in claim 5 the further improvement wherein said pressure vessel is the engine fuel tank and said volatile liquid is a pressure liquifiable fuel, said fuel system further comprising conduit means operatively connecting said second heat exchanger to said fuel injection nozzle for conveying fuel from said second heat exchanger to said fuel injection nozzle.

9. In the momentum compression ramjet engine as defined in claim 8, the further improvement comprising a third heat exchanger in heat exchange relation of said combustion chamber and operatively connected in said conduit means connecting said second heat exchanger and said injection nozzle whereby fuel passing from said second heat exchanger is again heated and vaporized before reaching said fuel injection nozzle.

10. In the momentum compression ramjet engine as defined in claim 9, the further improvement comprising throttle valve means operatively connected in said pressurized fuel system for controlling the rate of flow of fuel from said fuel tank.

* * * * *